Aug. 12, 1969 J. H. LEMELSON 3,461,197
METHOD FOR PRODUCING COMPOSITE ARTICLES
Filed March 22, 1963 3 Sheets-Sheet 1
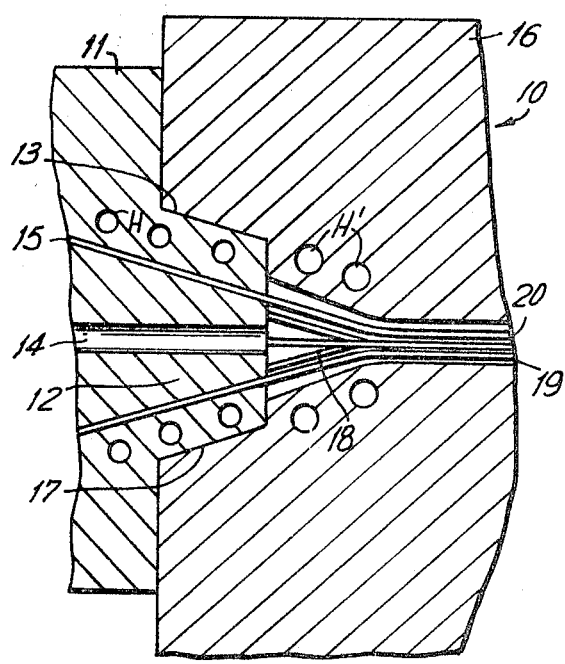
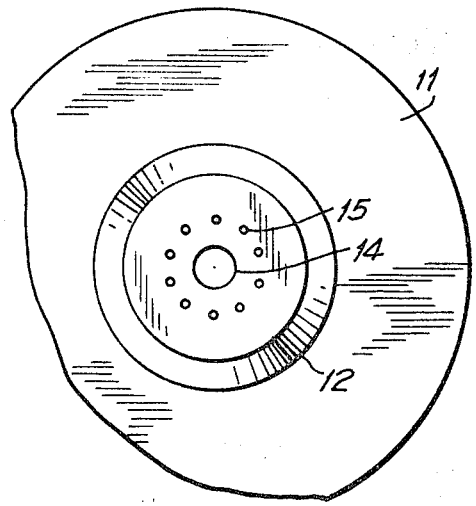
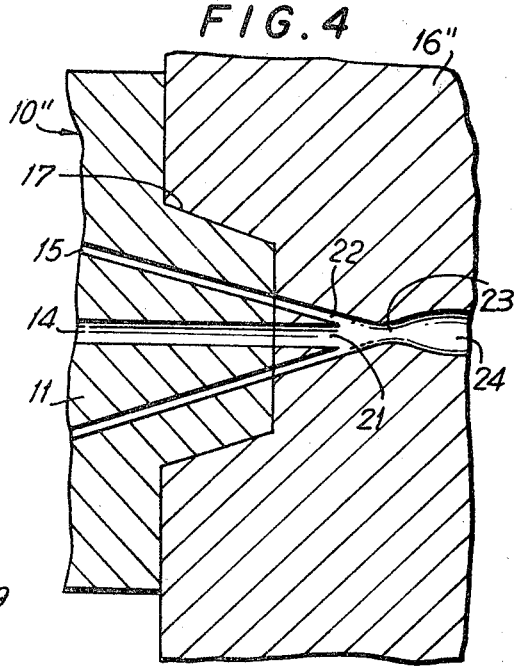
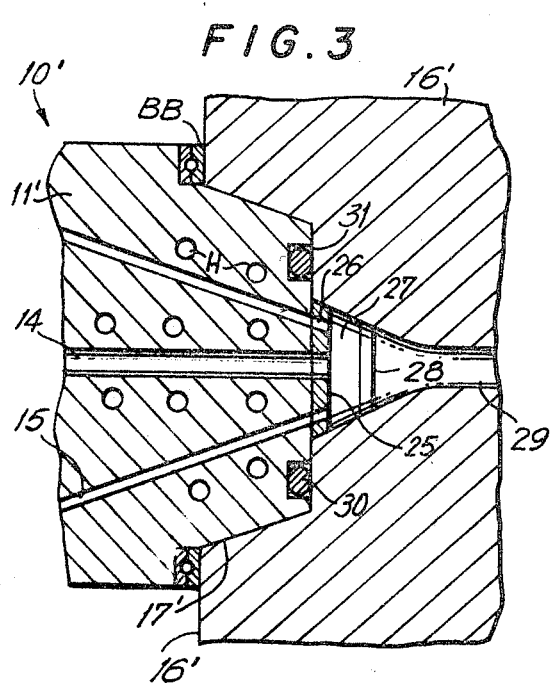
INVENTOR.
JEROME H. LEMELSON
BY
Ostrolenk, Faber, Gerb & Soffen
ATTORNEYS

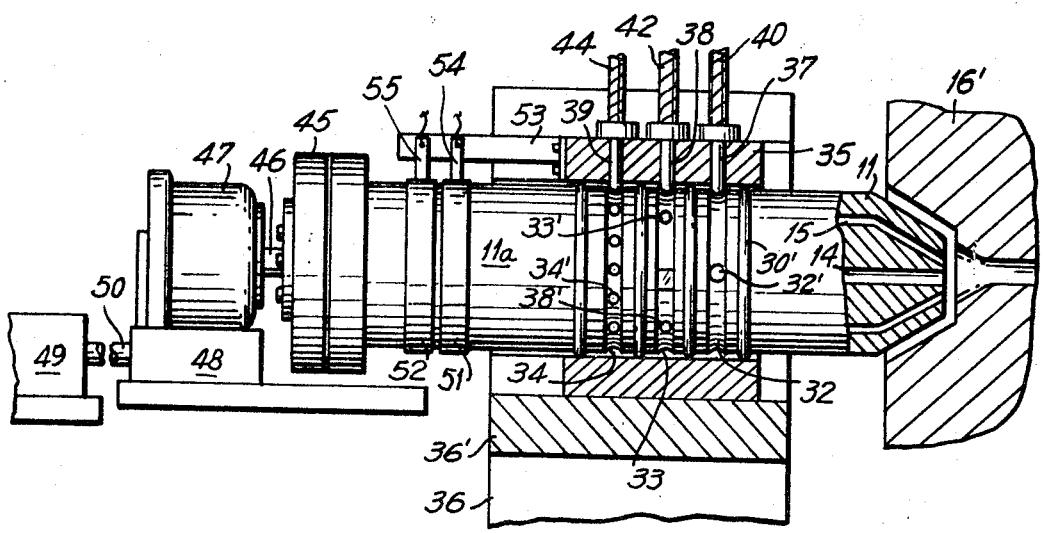

Aug. 12, 1969  J. H. LEMELSON  3,461,197
METHOD FOR PRODUCING COMPOSITE ARTICLES
Filed March 22, 1963  3 Sheets-Sheet 3

INVENTOR.
JEROME H. LEMELSON
BY
Ostrolenk, Faber, Gerb & Soffen
ATTORNEYS

United States Patent Office 3,461,197
Patented Aug. 12, 1969

3,461,197
METHOD FOR PRODUCING COMPOSITE
ARTICLES
Jerome H. Lemelson, 8B Garfield Apartments,
Metuchen, N.J. 08840
Continuation-in-part of application Ser. No. 651,749,
Apr. 9, 1957. This application Mar. 22, 1963, Ser.
No. 267,262
Int. Cl. B29f 1/12; B29c 9/00
U.S. Cl. 264—172                  5 Claims

ABSTRACT OF THE DISCLOSURE

A method for making composite, shaped articles, involving feeding a first fluent material through an orifice into an adjacent mold or die, while simultaneously intermittently feeding discrete portions of a second fluent material through a number of orifices disposed concentrically of the first and into the adjacent mold or die, the second material thus forming an array of discrete filamentary segments dispersed in and contiguous with the first material as it passes into the mold or die.

---

This invention relates to methods for fabricating articles of composite materials and is a continuation-in-part of my copending application Ser. No. 651,749 filed Apr. 9, 1957 for Plastics Fabrication and now abandoned.

It is known in the art to fabricate articles by molding a material comprising a composition of a first thermoplastic or thermosetting plastic material having disposed therein a plurality of reinforcing filaments such as fibers or filaments of glass. Such reinforcing members are generally mixed with the molding material prior to its injection into a mold to be formed to the shape of the desired article. The fabrication technique has certain shortcomings including the inability to precisely control the mixture as to its composition and orientation of the filaments therein. In addition, control is nesessitated of the mixing operation and frequently the filaments become scattered, damaged or disoriented in the mixture. Furthermore, the density of filaments may vary at different locations in the mixture resulting in a molded article having different filament densities throughout.

It is accordingly a primary object of this invention to provide an improved method for molding or extruding articles made of a composition of two or more different materials.

Another object is to provide such a method for extruding or molding articles having reinforcing filaments disposed therein.

Other objects will become apparent as the description proceeds.

To the accomplishment of the above and related objects, the invention is embodied in the forms illustrated in the accompanying drawings, attention being called to the fact, however, that the drawings are illustrative only and that changes may be made in the specific constructions shown and described without departing from the spirit and scope of the invention.

In the drawings:

FIG. 1 is a sectioned view illustrating a fragment of an injector assembled with a mold or extrusion die and operative for feeding a plurality of different materials therethrough for molding to a predetermined shape;

FIG. 2 is a fragmentary view of the end of the injector of FIG. 1;

FIG. 3 is a cross-sectional view of a rotatable injector and mold or die assembled therewith for receiving injection material as the former rotates or oscillates;

FIG. 4 is a cross-sectional view of an injector and mold or die which is a modified form of the embodiment illustrated in FIG. 1;

FIG. 5 is a side view with parts broken away for clarity showing further details of an apparatus of the type shown in FIG. 3.

Figure 6:
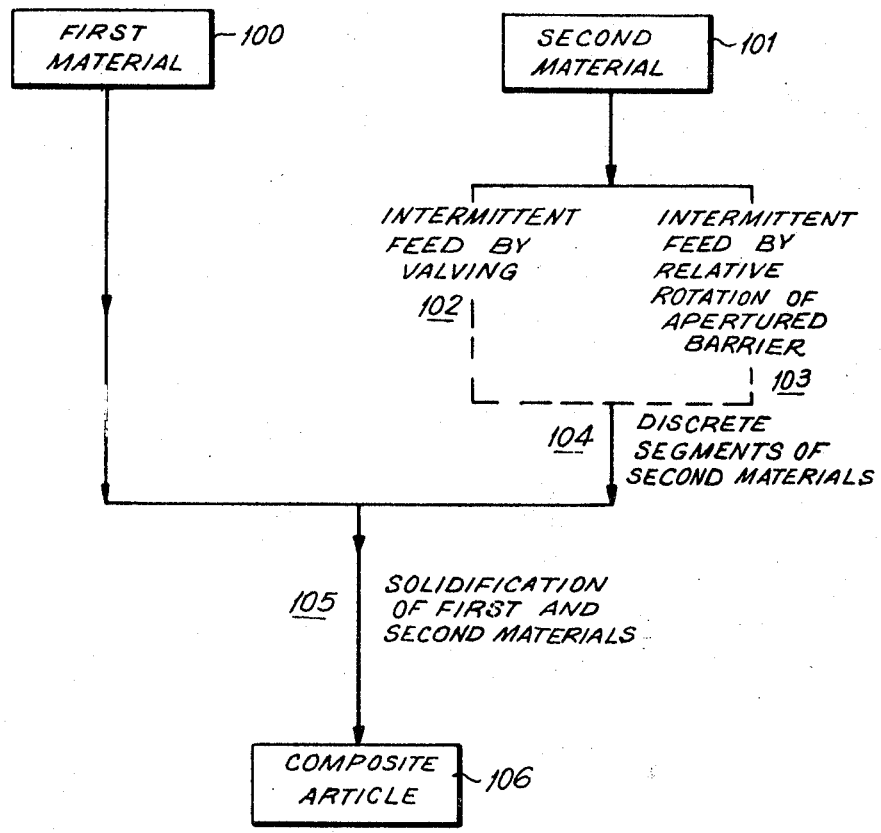
FIG. 6 is a flow sheet illustrating, in diagrammatic form, the successive steps of the present invention.

Referring initially to FIG. 6, there is shown, in block diagram form, the successive stages of the present method for producing a composite shaped article constituted of a shaped, substantially homogeneous plastic material 100 and a second plastic material 101 to be distributed in the first plastic material is discrete, filamentary segments contiguous therewith. The first and second plastic materials are coextruded, the first material 100 being continuously extruded in a fluent state and the second material 101 being intermittently extruded in discrete fluent portions into contact with the first plastic material. The intermittent feed of material 101 may be effected, as indicated more fully hereinafter, by valving the flow of such material, as schematically illustrated at 102, or by interrupting the material feed by the relative rotation of an apertured barrier as schematically indicated at 103. There thus results an array 104 of discrete, elongated and filamentary segments of the second plastic material which are fed into contact with the first plastic material and solidified at step 105 to permanently define the array of the second material in the thus formed composite, shaped article 106. Preferred compositions and techniques for carrying out such method will be apparent from the following detailed description thereof.

There is shown in FIG. 1 components of a machine or assembly 10 applicable for injection molding or extruding articles of manufacture of two moldable and flowable materials of any suitable characteristic with the requisite that one may be injected or made to flow directly into the other after they have entered the die or mold. The injector 11 is illustrated as abutting and in operative engagement with the front face 16' of a die or mold 16a. The tapered nose or nozzle 12 of the injector 11 is shown having its conical sidewall 13 and endwall compressively engaged against the conical sidewall and the bottom of a cavity 17 in the face 16a' of the die or mold 16 so as to effect a pressure seal between the two and to permit pressurized communication between a plurality of passageways 14 and 15 which terminate at the end of 12 and a passageway 18 in 16 terminated at the base of cavity 17. Injector 11 may be fixed relative to mold 16 or may be longitudinally removable therefrom and/or rotatable as described hereafter.

In the end view of injector 11 shown in FIG. 2, the larger passageway 14 is shown centrally passing through the nozzle 12 and a plurality of smaller passageways 15 are shown equally disposed around the central passageway. Although any suitable arrangement of said passageways is possible, depending on the desired flow configurations of materials, the configuration illustrated in which the smaller diameter passageways 15 converge as illustrated in FIG. 1 will suffice where it is desired to form or otherwise dispose a plurality of small diameter filaments in a substantially symmetrical array within a larger filament rod, tube or otherwise shaped article for decorative or reinforcing purposes. Supplemental sealing means between members 11 and 16, as illustrated for example, in FIG. 3, may also be utilized in the apparatus of FIG. 1 if necessary. Notation H refers to a passageway or passageways extending through the nozzle portion 12 of 11 and other portions of 11 which may be utilized for circulating a liquid coolant such as water therethrough in the event that the material injected through the passageways 15 is at a substantially higher temperature than the material injected through the central passageway or passageways 14 whereby the transferred heat would ordinarily have a detrimental effect on the latter material. Notation H' refers to one or more passageways disposed in member 16 adjacent the receiving passageway 18, which may also be utilized for transferring heat from the wall of both passageway 18 and the end of nozzle 12. Control of the flow of heat transfer fluid through either or both passageways H and H' may be utilized to control the temperature and solidification of the materials injected into the die or mold.

Either or both the passageways H and H' or passageways adjacent thereto may contain resistance heating elements if it is necessary to heat the injector 11 or die 16 to maintain certain thermoplastic materials flowing therethrough in a molten state or, if a thermosetting resin is utilized, to heat said resin to cause it to solidify downstream of passageway 18.

In FIG. 3 the injector and mold have been modified and are referred to by the notations 11' and 16'. The injector 11' is adapted to rotate or oscillate at a predetermined rate relative to the mold or die 16' while the materials are being injected therein to perform one or more of a plurality of important functions. In other words, either or both the injector 11' or the die or mold 16' may be moved in a rotary manner relative to the other to affect the shape and distribution of the material or materials injected through the peripheral injection passageways 15. A circular channel 31 is provided in the end face of the tapered nose 12' of the injector 11' in which is retained a hollow metal O-ring 30 which normally protrudes outward from the face of the nozzle and compressively engages the bottom face of the cavity in 16' so as to effect a fluid pressure seal between the two as 11' or 16' rotate relative to each other. Notation 27 refers to the end of the pasageway 29 through the mold or die 16' which either terminates at the flat bottom of the tapered cavity 17' therein or is covered by an orifice plate 25, the function of which will be described hereafter. A circular ball bearing BB is shown disposed between members 11' and 16' and preferably secured to the former to simplify the relative rotation of the two while they are compressively engaged together. Accordingly, the ball bearing is preferably position so as to permit compressive and sealing engagement of the O-ring 30 against the bottom face of the cavity 17'.

Also shown in FIG. 3 are means for affecting the shape of filaments of material which may be delivered through or formed by means of the outer passageways 15, after they have entered the mold chamber 27. Member 25 is a disc-shaped plate covering the end of chamber 27 and having a plurality of peripheral openings or holes 26 aligned with the openings 15 when the injector 11' is at one or more predetermined angular positions relative to 16'. When not so aligned, the openings at the end of passageways 15 are momentarily closed off by the plate 25. The material flowed into the passageways 15 will thus be intermittently injected into the chamber 27 and may form therein and be carried along in the stream flow of the material injected through the central passageway 14 and the central opening 26', as a plurality of short streams or lengths of said material which form as short filaments within the material injected into the passageway 29 directly beyond the chamber 27 or further downstream thereof. Notation 28 refers to a bar or spider-like array of small diameter bars disposed across chamber 27 which may be optionally utilized to enhance or improve mixing of the filamental elements injected through the passageways 15 of nozzle 11' by reacting thereon as the elements flow therepast. It is noted that either or both members 26 and 28 may be eliminated from the die or mold depending on the nature of the material injected therein and the desired mixing or shaping effect on the material or materials. If both members 26 and 28 are eliminated from the assembly or mold 16', and a liquid is injected through each of the passageways 15 which may solidify as a plurality of defined filaments or streams within the liquid injected through 14 into the chamber 27, then said filaments may form a spirally extending array of filaments which may form a thread or cord extending along the center of the material formed in passageway 29. If the member 16' is an extrusion die or spinnerette, a reinforced rod, thread, rope or tube may be so formed.

FIG. 4 illustrates an injection nozzle 11 similar to the nozzle of FIG. 1 assembled with a die or mold 16" having a receiving chamber 21 terminating at the bottom wall of the cavity 17 therein which receives the tapered nose 12 of 11 as described. The chamber 21 comprises a central hole 21' aligned with the central passageway 14 in 11 and a plurality of converging holes 22 which are aligned with the peripherally extending passageways 15 through 11. Thus material flowed through passageways 14 continues in its flow into the mold or die 16' without mixing with the material injected through 14 until it has flowed to a restricted portion 23 of the passageway therein. Beyond 23 the passageway in the mold or die 16" increases in diameter. The restriction or reduced diameter portion 23 of the passageways in 16" is provided to cause the filament elements or material injected through the passageways 15 to converge whereafter they will be substantially centrally disposed in the passageway portion 24 and in the resulting extruded filament, thread or rod.

FIG. 5 illustrates further details of the apparatus shown in FIG. 1, with various of the details of the injector and mold structure omitted for purposes of clarity. The injector 11 is illustrated as an elongated metal cylinder or rod, the rear end 11a of which is secured to a coupling 45 which is mounted on the end of a shaft 46 of a gear motor 47 adapted for rotating said coupling and the member 11. Similar means may also be provided for rotating the mold or die 16'. The gear motor 47 is mounted on a base 48 which is longitudinally movable by means of a lineal motor 49, the shaft 50 of which is coupled to 48. Both motors 47 and 49 may be of any suitable operating characteristic and may comprise electric, hydraulic or pneumatic motors which are preferably respectively speed and displacement controllable.

Notation 35 refers to a cylindrical sleeve or collar assembled along and circumscribing a central portion of the injector 11. The collar 35 moves longitudinally with the injector 11 as it is advanced and retracted by the ram or lineal motor 49 but does not rotate therewith and serves as a rotary seal or coupling through which a plurality of fluids such as the injection materials and, if utilized, a heat transfer fluid may be flowed. A plurality of holes or passageways 37, 38 and 39 extend radially through the collar from the inside surface thereof and communicate with conduits or pipes 40, 42 and 44 which are welded or retained by means of fittings 41 in sealing engagement with the collar. Each of the openings 37 to 39 communicate with respective channels 32, 33 and 34 which circumscribe the outer surface of the cylinder 11. One or more radial holes extend from each of said channels 32 to 34 to their respective longitudinal passageways. In FIG. 5, for example, the inlet 40 communicates with the collar passageway 37 which communicates with channel 32 which is connected to the central passageway 14 through one or more radial holes 32'. Liquid plastic may thus be supplied through the conduit 40 under sufficient pressure to flow into the receiving passageway 18 at a sufficient rate to completely fill and retain said chamber filled during the injection or extrusion process. Water or other coolant may be flowed through the conduit 42, into channel 33. The channel 33 is actually divided into two channel portions which communicate with each other only by means of the passageways H so that water admitted through conduit 42 and into one portion of the channel will circulate throughout the injector 11 and may be discharged or recirculated through a second conduit.

The peripherally injected liquid plastic or glass is introduced through one or more conduits 44, flows through a passageway or passageways 39 in collar 35, thence into one or more channels such as 34 which communicate with the passageways 15 through respective radial holes therein.

Notation 36 refers to a supported base which retains a sleeve 36' through which collar 35 longitudinally moves during the movement of the injector into and away from engagement with the mold or die 16'. A plurality of O-rings 30' are compressively disposed within channels circumscribing the cylindrical wall of 11 on both sides of each of the channels 32, 33 and 34 to effect rotary pressure seals between each of said channels, the passageways in the collar and the interior and exterior surfaces of 35 and 11. The O-rings 30' are also compressively seated within channels cut in the inside wall of the collar 35 and may be made of tubular metal or high temperature resins such as silicone rubber or the like. As noted above a heat transfer or coolant liquid may also be circulated through passageways in the collar 35 if the temperature of one or more of the injection fluids is such as to render such circulation necessary.

The following discussion includes variations in the methods in which the apparatus of FIGS. 1 to 5 are applicable in so far as materials and mode of operation are concerned. The injection materials may comprise one or more of the following combinations:

(1) The material injected through the centrally disposed passageway or passageways 14 of the injector 11 may comprise any suitable thermoplastic plastic while the material injected through the circumscribing, smaller passageways 15 may comprise a second thermoplastic plastic, both in a molten or liquid condition and at a temperature such that the material injected through passageways 15 will form continuous filaments within the material injected through 14 whereby said filaments become encapsulated within the other material in the die or mold as both solidify downstream of the locations illustrated in the drawings. Either or both materials may comprise thermosetting resins which solidify downstream of the mixing chamber to define either an elongated extruded member or a molded shape. Thus the filaments 15 may be utilized for reinforcing and/or decorative purposes depending on their properties. If the material injected through passageway 14 is a self-foaming plastic which expands into a cellular structure, then thermoplastic plastic injected through passageways 15 may form filaments within the member extruded within the die opening 19 which may be utilized to reinforce and serve as a core for the extrusion. Combinations of other well known thermoplastic materials may include the injection of a low density or relatively flexible plastic such as plasticized vinyl, low or medium density polyethylene or polypropylene, flexible urethane or the like through passageway 14 and plastic having a higher tensile strength such as higher density polyethylene, polypropylene, polycarbonate, polyamide, or the like may be injected through the passageways 15 for reinforcing the more flexible material which substantially fills the receiving passageway or injection chamber 18.

(2) The material injected into passageway 14 which fills the injection chamber 18, save for the filament forming material, may comprise any suitable thermoplastic or thermosetting resin while the material injected through the passageways 15 may comprise a glass or ceramic in a molten state which forms filaments within the first material which filaments are quickly carried along in the stream thereof either as elongated, reinforcing elements or a plurality of short filaments the lengths of which are defined by apparatus such as illustrated in FIG. 3. The lengths of such filaments may also be defined by intermittently injecting glass or other suitable material into the passageways 15 by, for example, valving means or the like. Depending on the rate of flow of primary injection material through passageway 14, the diameter of the passageways 15, the total amount of material flowed into the die or mold and the heat transferred from the injector nozzle, for certain applications it may be necessary to utilize a plastic which will not deteriorate or char when flowed through the passageway 14 into the mixing chamber 27. Various thermosetting and thermoplastic materials are known in the art which have relatively high melting points and will withstand the deteriorating effects of heat at temperatures above 400° to 500° F. or higher for a sufficient length of time to permit the extrusion or molding of said material containing fibers or filaments injected as described, and solidified therein. For example, formulations of epoxy and silicone resins will withstand temperatures of 500° F. and higher for extended periods of time so that filaments of glass of substantial diameter may be formed within the chamber 18 by the injection of molten glass streams therein. For applications where a short length of extrusion or a limited amount of material containing formed-in-place glass filaments is to be injected into a mold, cooling means in the immediate vicinity of the nozzle 12 may not be necessary since the liquid plastic injected through passageway 14 may serve as a heat transfer medium and the molten glass may be completely purged from the passageways 15 by means of air or other fluid applied immediately behind a predetermined charge of said glass.

(3) The apparatus provided may also be utilized to combine by injection, as described, two metals, a metal and glass or a metal and other suitable ceramic material. For example, the primary metal which substantially fills chamber 18 and is ejected from passageway 14 may comprise a metal of a relatively low melting point such as aluminum or other suitable non-ferrous metal. The metal injected through passageways 15 to form filaments or fibers within the primary metal may comprise a metal such as steel or other reinforcing metal of higher melting point than that injected through 14. The mold or die 16 may have any suitable shape and may be provided to form extrusions of tubular or solid shape of any known configuration which are reinforced by the plurality of filaments injected through passageways 15. The metal injected through passageways 15 may be in a semi-molten condition when ejected from member 11 so as to immediately form defined filaments in the die or mold. Such metal may also be cold-expressed through openings 15 or guided through the passageways 15 in the shape of preformed wire or rod elements, and drawn therefrom.

(4) The material ejected from passageway 14 may comprise a molten glass or ceramic material and that ejected from passageways 15, a conducting or reinforcing metal such as aluminum, copper, steel or alloys of these materials.

(5) Other fluent materials such as powders, chips, short fibers more combinations of these materials may be forced through the openings 15 and/or 14 to combine with a molten or liquid material injected into the chamber 18 for reinforcing purposes and carried therefrom downstream of the chamber into the die or mold. If extended, the materials may be drawn from the die.

Flow of either the primary or the peripherally produced materials may be interrupted one or more times during a cycle to vary the shape or density of the reinforcing material in the eventually extruded or molded piece. The density or other characteristics of the molded or extruded piece may also be varied or increased by means of varying the pressure applied to the material injected through the passageway 14 during a cycle of operation.

Depending on the characteristics of the materials being injected, it may be necessary to heat portions of the injector 11 in order to maintain one or more of the flowing materials in a fluid state. Accordingly, FIG. 5 shows a pair of metal slip-rings 51 and 52 insulatedly mounted on the rear portion 11a of the injector against which respective brushes 54 and 55 ride as the injector rotates. The brushes are mounted on a base 53 made of insulating material which is secured to the collar 35. One or more heating elements (not shown) are electrically connected to the slip-rings 51 and 52 and extend through passageways or holes provided in the injector 11 which are preferably immediately adjacent one or more of the passageways 14 and 15. Electrical resistance heating elements may also be provided in the collar 35 adjacent the passageways 37, and 39 if necessary. It is also noted that the injector 11 is preferably made of a plurality of components which are disassembleable to permit cleaning of the passageways and repair or replacement of said heating elements.

The apparatus illustrated in FIGS. 1 and 3 may also be utilized for fabricating a plurality of different textile elements of the type shown in my copending application Ser. No. 651,749 having a core member made of a first thread or filament which is completely surrounded by a jacket of a second material. The core thread, for example, may provide the major portion of the strength for the composite thread while the softer jacket or covering may provide a smooth texture which is substantially easier to wear and more comfortable when brought in contact with the skin of the wearer. Thus the apparatus of FIG. 1, for example, may be operated whereby a preformed thread or filament is fed through the centrally disposed opening 14 while the coating material therefor is introduced through one or more of the peripherally disposed openings 15. The peripherally disposed openings may provide the major portion of the coating material in the mixing chamber 18 while a filament is formed therein by ejection from a molten or fluid state through the centrally disposed opening 14 and is carried along with the stream of material ejected from the openings 15 downstream in or beyond the spinnerette or die 16.

Material introduced through the plural openings 15 may comprise a urethane plastic containing a blowing agent which immediately foams into a cellular plastic in and beyond the mixing chamber 18 which completely surrounds the continuously fed thread or filament introduced into 18 through the opening 14 in 11 or the filament formed from the liquid material ejected through 14 into chamber 18. The core member may thus comprise a filament or thread of such plastics as polyester, polycarbonate, polypropylene, cellulose acetate rayon, nylon, epoxy and phenoxy, etc. These may be preformed and fed through 14 from a continuous supply or may be actually extruded to shape from injector 11.

Other materials which may be added to the extrusion or molding through either passageways 14 or 15 may include glass beads, chips, flakes or the like which impart optical or strength characteristics to the extrusion or molding formed in or beyond mold or other tool 16. Reinforcing fibers such as glass or synthetic plastic fibers cut to short lengths may also be introduced under pressure per se or in mixture with a fluid plastic material through the passageway 14 and/or passageways 15. A continuously formed glass thread may also be fed through the passageway 14 into the chamber 18 with plastic introduced through the passageways 15 utilized to continuously coat said glass thread which may be thereafter utilized in various ways. For example the glass thread containing a coating of a suitable resin such as a polyester, polycarbonate or other resin, ceramic or other material may be fed from the tool 16 onto a rotating form for fabricating a so called "filament wound" article of manufacture. Such an apparatus would include means for either longitudinally moving the rotating article or the tooling illustrated in either FIGS. 1, 3 or 4.

I claim:

1. A method for producing a composite, shaped article constituted of a first, substantially homogeneous plastic material and a second plastic material contiguous with and distributed in said first plastic material in discrete, filamentary segments, which method comprises:

(a) continuously extruding said first plastic material in a fluent state through a first orifice and into a chamber aligned therewith;

(b) intermittently extruding discrete portions of said second plastic material in a fluent state through a plurality of orifices disposed concentrically of the first orifice and into contact with the first plastic material within said chamber, the second plastic not initially mixing with said first plastic but defining an array of discrete, elongated and filamentary segments distributed in and contiguous with the first plastic as it flows through said chamber; and (c) solidifying said first and second plastic materials as they flow through said chamber to permanently define said array in the thus formed composite, shaped article.

2. The method of claim 1, in which relative rotation is induced between said plurality of orifices and said chamber during the feeding or extrusion operations, and in which the first and second materials are solidified in step (c) with said discrete filamentary segments defining a spirally extending symmetrical array formed lengthwise of and through the resulting shaped article.

3. The method of claim 1, in which the portion of the second material extruded through each of said plurality of orifices is fed through an apertured barrier interposed between each said orifice and said chamber, and in which said plurality of orifices and said apertured barrier are rotated relative to one another during the coextrusion of the second material, to fragment the latter into the desired discrete filamentary segments thereof.

4. The method of claim 1, in which the flow of the second material during coextrusion thereof is periodically interrupted by appropriate valving to effect intermittent injection of the said material into said chamber, and thereby provide said array of discrete filamentary segments of the second material.

5. The method of claim 1, in which the first and second materials are initially substantially in the liquid state and are maintained in contact with suitable heat exchange media prior to being extruded in steps (a) and (b), in order to maintain said materials at least principally in the liquid state prior to solidification thereof.

References Cited

UNITED STATES PATENTS

| | | | |
|---|---|---|---|
| 3,023,461 | 3/1962 | Sherman | 264—173 X |
| 3,075,242 | 1/1963 | Grafried. | |
| 2,021,828 | 11/1935 | Berry | 72—261 |
| 2,138,378 | 11/1938 | Johnson | 264—171 |
| 2,456,141 | 12/1948 | Myerson | 18—13 |
| 2,510,135 | 6/1950 | Pedlow et al. | |
| 2,571,457 | 10/1951 | Ladisch. | |
| 2,610,607 | 9/1952 | Isenberg | 18—13 X |
| 2,764,565 | 9/1956 | Hoppe et al. | |
| 2,778,059 | 1/1957 | Henning et al. | 264—174 X |
| 2,815,033 | 12/1957 | Braunlich | 18—13 X |
| 2,835,927 | 5/1958 | Henning | 264—47 |
| 2,904,846 | 9/1959 | Smith | 264—174 |
| 2,931,091 | 4/1960 | Breen. | |
| 2,976,177 | 3/1961 | Warthen | 117—126 X |
| 2,994,327 | 8/1961 | Otto et al. | 264—47 X |
| 2,174,779 | 10/1939 | Delorme | 264—75 XR |
| 2,803,041 | 8/1957 | Hill et al. | 264—75 |
| 220,907 | 10/1879 | Arbogast | 65 |
| 1,422,532 | 7/1922 | Breit | 164—282 XR |
| 2,569,150 | 9/1951 | Brennan | 164—275 XR |
| 3,126,139 | 3/1964 | Schechter | 264—45 XR |
| 3,207,818 | 9/1965 | Marshall | 264—14 |
| 3,245,769 | 4/1966 | Eck et al. | 65—146 XR |

(Other references on following page)

UNITED STATES PATENTS

| | | | |
|---|---|---|---|
| 3,295,174 | 1/1967 | Webber et al. | 164—275 |
| 3,320,338 | 5/1967 | Lemelson | 264—14 |
| 3,349,837 | 10/1967 | Brondyke et al. | 64—282 XR |

FOREIGN PATENTS

| | | |
|---|---|---|
| 598,898 | 6/1934 | Germany. |
| 1,157,978 | 1/1958 | France. |
| 374,147 | 6/1932 | Great Britain. |
| 614,800 | 12/1948 | Great Britain. |

PHILIP E. ANDERSON, Primary Examiner

U.S. Cl. X.R.

18—13; 164—282; 260—2; 264—174, 47